May 16, 1967  J. E. CREAGER  3,319,888
VACUUM OPERATED AUTOMOTIVE TEMPERATURE CONTROL SYSTEM
Filed Feb. 25, 1966
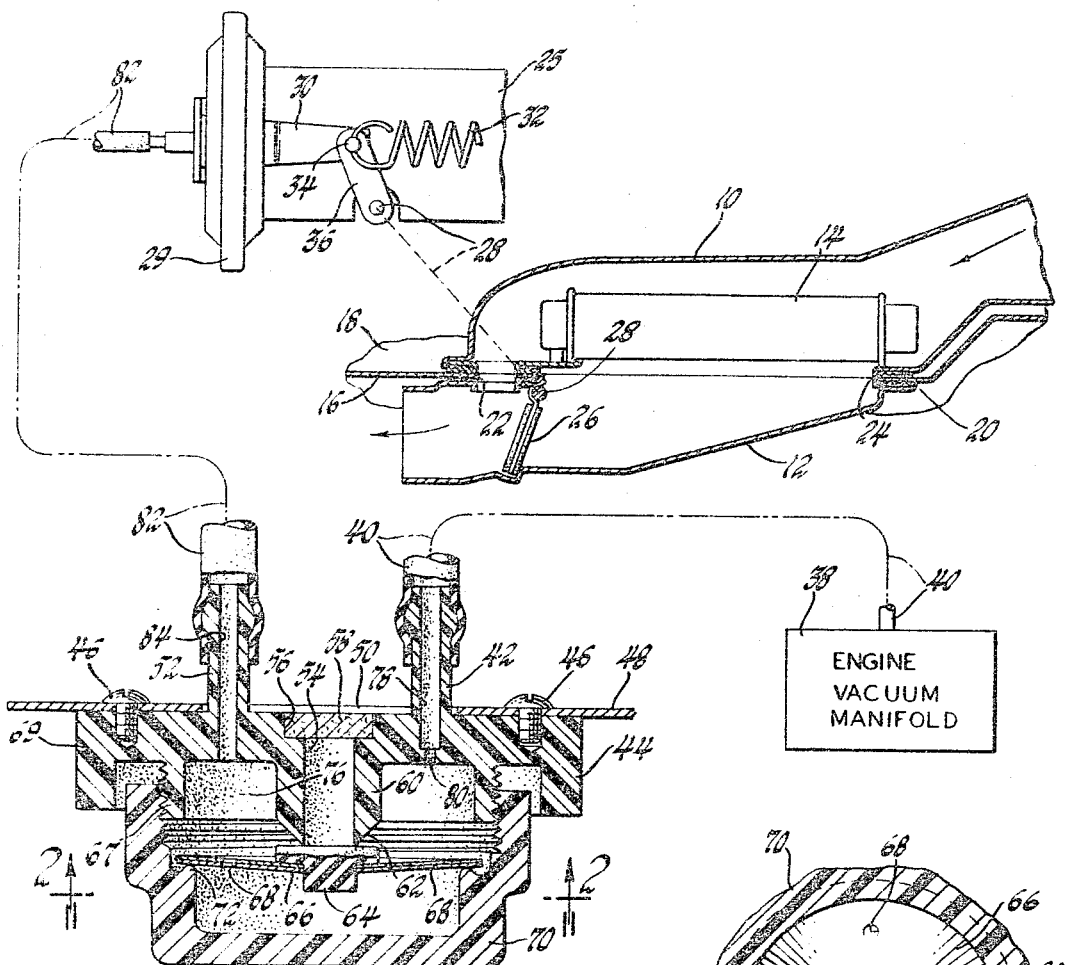
INVENTOR.
John E. Creager
BY
George E. Johnson
ATTORNEY

United States Patent Office 3,319,888
Patented May 16, 1967

3,319,888
VACUUM OPERATED AUTOMOTIVE TEMPERATURE CONTROL SYSTEM
John E. Creager, Fenton, Mich., assignor to General Motors Corporation, Detroit, Mich., a corporation of Delaware
Filed Feb. 25, 1966, Ser. No. 530,095
10 Claims. (Cl. 236—87)

ABSTRACT OF THE DISCLOSURE

This invention relates to a system for automatically controlling the temperature of a passenger compartment of an automobile and includes a prompt response temperature sensitive valve regulating a supply of vacuum to a motor for positioning a heat flow regulating element such as a valve or damper whereby a flow of heat to the compartment is suitably regulated with a minimum of hunting effect and a maximum of uniformity in the controlled temperature.

State of the prior art

The United States patent to Young et al., 3,187,640, discloses a multi-stage vacuum operated motor for positioning a damper. No disclosure is made whereby the control of temperature may be effected automatically.

The United States patent to Hans, 2,476,295, shows a system in which the temperature of a passenger compartment is regulated by means of a damper and the latter is controlled by a vacuum motor. The motor is operated by a degree of vacuum somewhat determined by the compartment temperature. The relation of cause to effect is remote so the resulting control is slow acting.

The United States patent to Stone, 2,968,471, discloses an automobile air conditioning system using vacuum operated controls, the action of which is modified by electrical heating of a bimetal.

The United States patent to Hans, 2,304,642, discloses a plurality of valves controlling an air conditioning system and a thermostat varies a vacuum utilized to move the valves.

Description of the invention

In the drawings:

FIGURE 1 is a schematic view of major components of an automobile heating system with portions being shown in section and duct work including a heater core being drawn to a reduced scale;

FIGURE 2 is a sectional view looking in the direction of the arrows 2—2 in FIGURE 1; and FIGURE 3 represents plotted curves showing actual results achieved in the use of the system of FIGURE 1.

In FIGURE 1, duct work 10, 12 and a heater core 14 are shown mounted on a fire wall 16 separating an automotive engine compartment 18 from a passenger compartment 20. The wall 16 is apertured at 22 for conveying unheated outside air to the compartment 20 and at 24 for conveying heated air from the core 14 to the compartment 20. A heat flow regulating element in the form of a damper 26 is mounted on a rotatable shaft 28 to proportion or select the flow of air from the apertures 22 and 24. This duct work and the damper are much as disclosed in the United States Patent No. 3,084,866, granted Apr. 9, 1963, in the name of E. E. Keightley.

A bracket 25 is shown for supporting a diaphragm type vacuum motor 29. This motor has a central shaft projection 30 which is adapted to be moved in one direction by means of a spring 32 and in the other direction by means of a diaphragm in the motor and to which a vacuum may be applied. The spring end of the projection 30 is pivoted as at 34 to an arm 36 which is joined to turn with the shaft 28. From this, it may be seen that movement of the motor projection 30 to the right by virtue of the spring 32 will cause the damper 26 to close the aperture 22 and open the duct leading from the aperture 24 whereas movement of the motor projection 30 to the left when vacuum is applied will cause the damper 26 to assume the position as shown in the drawings thereby closing off all flow from the heater core 14 and opening the aperture 22.

An engine vacuum manifold is diagrammatically depicted at 38 and this manifold is connected by a conduit 40 to a nipple 42 forming an integral part of a plastic valve or control unit body 44. The latter is mounted by means of screws 46 to the instrument panel of the automobile and a portion of this panel is shown at 48. The latter is apertured at 50 not only to receive the nipple 42 but also a second nipple 52 and also to provide communication between an air inlet port 54 formed in the body 44 and the passenger compartment 20.

The inlet port 54 is enlarged as at 56 to retain an air filter disk 58. The inlet port is defined by an interior cylindrical wall 60 and this is tapered as at 62 to form a circular seat for a pad 64. The latter is retained on a bimetal valve element 66 which is apertured as at 68.

The body 44 carries two coaxial skirts 67 and 69 which are spaced to receive the peripheral wall of a cup member 70. The inner skirt 67 is threaded adjustably to engage the cup member 70 for a reason to be described hereafter. An annular shoulder 72 is formed around the interior of the cup member 70 and this shoulder retains the bimetal disk 66 and the pad 64 in proper position with relation to the air inlet port 54. The conduit 40 communicates with an annular space 76 of the control unit by means of a passage 78 in the nipple 42 and a restriction or restricted port 80.

A conduit 82 connects the motor 29 with a passage 84 in the nipple 52. The conduits 40 and 82 permit a location of the thermostatic control unit remote from the other system components.

It will be appreciated that in the operation of the control system the damper 26 will be placed as shown in FIGURE 1 if it be assumed that no heating effect is desired for in this event all outside air admitted through the duct 10–12 will bypass the heater core 14 and flow into the passenger compartment 20. Vacuum will be applied to the motor 29 with the result that the aperture 22 will be opened by the damper 26. If vacuum is cut off from the motor 29, all the air will pass through the core 14 and maximum heating is obtained. If the damper 26 is placed in an intermediate position, the temperature of the passenger compartment will accordingly be regulated. An occupant of the car, responding to the fact that he is too hot or too cold may manually adjust the damper 26 position to control the ratio of heated air to bypass air as will be seen hereinafter, but the present system operates automatically and relies on a thermostatic control of a very simple and prompt acting type. Vacuum applied to the motor 29 will cause the spring 32 to move the damper to a position as shown in the drawing closing the passage from the aperture 24 to give cool air as stated above. A vacuum of a certain reduced value will act on the diaphragm motor 29 to overcome the initial spring bias and start moving the damper clockwise from its position of FIGURE 1 until a balanced condition is reached. If the damper motor 29 is operated at a value of vacuum somewhere in-between maximum and minimum the system will be operating in the control range—i.e., with maximum vacuum there is no heat and with no vacuum there is maximum heat.

In operation of the system and assuming that the manifold 38 is serving as a supply source of raw vacuum, the bimetal disk 66 will flex according to its temperature. This controls the volume of air which leaks from the compartment 20 through the filter 58 and past the valve pad 64 and through the restrictor opening 80. The degree of vacuum in the chamber 76 controls the position of the vacuum motor projection 30 and this degree will depend upon the relative size of the opening between the pad 64 and its seat as well as the size of the restrictor 80. From this, it may be seen that a continuous leak system is provided except when 100% cool air is required with the damper 26 positioned as shown in FIGURE 1.

When the engine is not running, no vacuum is available so atmospheric pressure acts on both sides of the disk 66. The valve opening under these conditions depends upon the position of the cup member 70 as determined by a threaded adjustment and the flexure of the disk 66 depending on its temperature. When the engine is running the vacuum creates a differential pressure across the valve which acts on the area of the air inlet 54 and causes the disk 66 to bend enough to create a balancing force. Even a small opening might be the cue for no heat as long as the vacuum in the chamber 76 and in the damper motor 29 is sufficient to move the damper 26 to 100% cool air. It will be noted that the cross-section of the passage 54 is larger than any cross section of the air flow passages.

The threaded adjustment modifying the valve opening results in an increase or decrease of the vacuum applied to the vacuum motor so that the latter will position the damper to call for less or more hot air in the mixture at the heated outlet.

In actual use of the system of FIGURE 1 in the automobile, ambient temperature conditions were encountered as shown in the chart of FIGURE 3. The curves illustrate results achieved in an approximate ambient temperature of about 15 degrees F. The car was started cold and it will be noted that after about thirty minutes the discharge temperature of the system was approximately 140 degrees F., but then this discharge temperature rapidly reduced as the front and rear portions of the passenger compartment became warmer. After about forty minutes operation the temperature conditions of the compartment stayed relatively uniform. After about an hour and twenty-five minutes operation it was decided to elevate the temperature of the compartment and the cup member 70 was rotated accordingly. With this adjustment the temperature of the passenger compartment 20 rose as desired and then remained at a relatively uniform level as the bimetal 66 was continually bathed in air flowing in from the passage 54.

I claim:

1. An automotive temperature control system comprising a heat flow regulating element, a vacuum motor linked to said element to position said element, a control unit mounted in a compartment the temperature of which is to be controlled, a source of vacuum supply, an air inlet port leading from said compartment to the interior of said control unit, a bimetal valve element within said unit and controlling said inlet port, connections of the said motor and also said unit interior where said bimetal valve element is located leading to said vacuum source, and the arrangement being such that the degree of vacuum imposed on said vacuum motor is dependent upon the effect of the temperature of said compartment on said bimetal valve element.

2. A system as set forth in claim 1, an instrument panel being in said compartment and remote from said heat flow regulating unit and vacuum motor, and said control unit being mounted on said instrument panel.

3. A system as set forth in claim 1, said control unit being adjustable whereby the temperature at which said bimetal valve element opens said inlet port may be controlled.

4. A system as set forth in claim 1, the said connections being restricted between said vacuum source and said unit interior.

5. A system as set forth in claim 1, said air inlet port having a cross section larger than any cross section of said connections, and a filter traversing said air inlet.

6. A system as set forth in claim 1, said heat flow regulating element being a proportioning damper controlling the flow of heated and relatively cool air.

7. A system as set forth in claim 1, said inlet port being closed when said heat flow regulating element shuts off the flow of heat.

8. A system as set forth in claim 1, said control unit interior being traversed by said bimetal valve element, and said valve element bearing a movable pad adapted to seat and close off said air inlet port when the temperature of said compartment is at a predetermined value.

9. A system as set forth in claim 1, said vacuum motor having a spring biasing it in one direction and adapted to balance the effect of the vacuum when said compartment is at a selected temperature.

10. A system as set forth in claim 1, said bimetal valve element being in substantial heat exchange relation with the air of said compartment promptly to sense the temperature of said air and effect operation of said motor accordingly.

References Cited by the Examiner
UNITED STATES PATENTS 2,811,314  10/1957  Lund _____ 236—87
3,221,991  12/1965  Houser _____ 236—87

WILLIAM J. WYE, *Primary Examiner.*